(12) United States Patent
Schaefer et al.

(10) Patent No.: US 12,523,564 B2
(45) Date of Patent: Jan. 13, 2026

(54) DETERMINATION OF STRUCTURE FATIGUE PROPERTIES

(71) Applicant: The Boeing Company, Arlington, VA (US)

(72) Inventors: Joseph D. Schaefer, Richmond Heights, MO (US); Brian P. Justusson, Saint Peters, MO (US)

(73) Assignee: The Boeing Company, Arlington, VA (US)

( * ) Notice: Subject to any disclaimer, the term of this patent is extended or adjusted under 35 U.S.C. 154(b) by 353 days.

(21) Appl. No.: 18/155,448

(22) Filed: Jan. 17, 2023

(65) Prior Publication Data
US 2024/0241009 A1    Jul. 18, 2024

(51) Int. Cl.
| | |
|---|---|
| G01N 5/00 | (2006.01) |
| G01M 5/00 | (2006.01) |
| G01N 3/02 | (2006.01) |
| G01N 3/04 | (2006.01) |
| G01N 3/06 | (2006.01) |
| G01N 3/32 | (2006.01) |

(52) U.S. Cl.
CPC ............ *G01M 5/0033* (2013.01); *G01N 3/04* (2013.01); *G01N 3/32* (2013.01)

(58) Field of Classification Search
CPC .. G01M 5/005; G01M 5/0033; G01M 5/0075; G01N 2203/0005; G01N 2203/0062; G01N 2203/0064; G01N 2203/0066; G01N 2203/0067; G01N 2203/0073; G01N 3/32; G01N 29/14; G01N 33/00; G01N 27/82; G01N 3/066; G01N 3/20; G06F 17/11; G06F 30/27

USPC ........................................................ 73/12.01
See application file for complete search history.

(56) References Cited

U.S. PATENT DOCUMENTS

2022/0412855 A1* 12/2022 Feng ...................... G01N 3/12

OTHER PUBLICATIONS

Zambelis, G., "A new approach in testing fatigue fracture mechanics properties in asymmetrical bonded composite/metal assemblies", Composites Part B, vol. 158, pp. 390-399, Feb. 1, 2019, Amsterdam, NL.

(Continued)

*Primary Examiner* — Brandi N Hopkins
(74) *Attorney, Agent, or Firm* — Joseph M. Butscher; The Small Patent Law Group LLC

(57) ABSTRACT

A method for determining fatigue properties of a structure includes mounting the structure in a load frame. The structure has a crack with a crack size. The method includes applying repeatedly an adjustable stimulus to the structure over multiple cycles. The adjustable stimulus is an adjustable load or an adjustable displacement applied to the structure. The method further includes storing the crack size at a start of the cycles, measuring a response of the structure subjected to the adjustable stimulus in each cycle, updating the crack size based on the response in each cycle, and updating the adjustable stimulus in each cycle. The adjustable stimulus as updated maintains a strain energy release rate approximately constant based on the crack size. The method includes calculating a growth rate of a crack propagation in the structure based on the response in each cycle, and storing the growth rate in a file.

20 Claims, 6 Drawing Sheets

(56) References Cited

OTHER PUBLICATIONS

Marcello, M. et al., "G-Control fatigues testing for cyclic crack propagation in composite structures", Engineering Fracture Mechanics, vol. 149, pp. 375-386, Jul. 2, 2015, Amsterdam, NL.

* cited by examiner

DETERMINATION OF STRUCTURE FATIGUE PROPERTIES

TECHNICAL FIELD

The disclosure relates generally to structural testing, and in particular, to determining structure fatigue properties.

BACKGROUND

Design approaches in composite structures generally account for fatigue damage in interlaminar domains (i.e., damage between plies, adhesive interfaces, co-bonded interfaces, co-cured interfaces, and combinations thereof). Verifying that the fatigue damage in an aircraft does not initiate and grow under cyclical loading involves lengthy testing. Historically, the airworthiness compliance and certification is achieved through physical testing with representative damage demonstrating that the damage does not grow under spectrum loads. Such physical testing is usually time consuming and expensive. As a result, identifying potential failure modes during design-test-certification building blocks is difficult.

Accordingly, those skilled in the art continue with research and development efforts in the field of simplifying structural fatigue property testing.

SUMMARY

A method for determining fatigue properties of a structure is provided herein. The method includes mounting the structure in a load frame. The structure has a crack with a crack size. The method includes applying repeatedly an adjustable stimulus to the structure over a plurality of cycles. The adjustable stimulus is an adjustable load or an adjustable displacement applied to the structure. The method further includes storing the crack size at a start of the plurality of cycles, measuring a response of the structure subjected to the adjustable stimulus in each of the plurality of cycles, updating the crack size based on the response in each of the plurality of cycles, and updating the adjustable stimulus in each of the plurality of cycles. The adjustable stimulus as updated maintains a strain energy release rate approximately constant based on the crack size. The method includes calculating a growth rate of a crack propagation in the structure based on the response in each of the plurality of cycles, and storing the growth rate in a file.

In one or more embodiments, the method includes repeating the applying of the adjustable stimulus, the measuring of the response, the updating of the crack size, the updating of the adjustable stimulus, and the calculating of the growth rate at a plurality of different strain energy release rates.

In one or more embodiments, the method includes calculating a Paris Law behavior of the crack within the structure based on the growth rate at the plurality of different strain energy release rates.

In one or more embodiments of the method, the load frame is operational to perform a Mode I test, a Mode II test, or a mixture of the Mode I test and the Mode II test.

In one or more embodiments of the method, the updating of the adjustable stimulus includes lowering an amplitude of the adjustable stimulus as the crack size of the crack increases.

In one or more embodiments of the method, the calculating of the growth rate of the crack propagation includes calculating a slope of a curve of the crack size as a function the plurality of cycles.

In one or more embodiments of the method, the updating of the crack size in the structure includes calculating a new value of the crack size with an analytical technique based on a compliance calculation.

In one or more embodiments of the method, the analytical technique is a linear elastic fracture mechanics technique or a nonlinear fracture mechanics technique.

In one or more embodiments of the method, the crack size determined during the plurality of cycles is characterized by a lack of a manual measurement of the crack size by a test operator.

A test system is provided herein. The test system includes a load frame and a computer. The load frame is operational to apply repeatedly an adjustable stimulus to a structure over a plurality of cycles. The structure has a crack with a crack size, and the adjustable stimulus is an adjustable load or an adjustable displacement applied to the structure. The load frame is further operational to measure a response of the structure subjected to the adjustable stimulus in each of the plurality of cycles. The computer is coupled to the load frame and is operational to store the crack size at a start of the plurality of cycles, update the crack size based on the response in each of the plurality of cycles, and update the adjustable stimulus in each of the plurality of cycles. The adjustable stimulus as updated maintains a strain energy release rate approximately constant based on the crack size. The computer is further operational to calculate a growth rate of a crack propagation in the structure based on the response in each of the plurality of cycles, and store the growth rate in a file.

In one or more embodiments of the test system, the load frame and the computer are further operational to repeat the application of the adjustable stimulus, the measurement of the response, the update of the crack size, the update of the adjustable stimulus, and the calculation of the growth rate at a plurality of different strain energy release rates.

In one or more embodiments of the test system, the computer is further operational to calculate a Paris Law behavior of the crack within the structure based on the growth rate at the plurality of different strain energy release rates.

In one or more embodiments of the test system, the load frame is operational to perform a Mode I test, a Mode II test, or a mixture of the Mode I test and the Mode II test.

In one or more embodiments of the test system, the update of the adjustable stimulus includes to lower an amplitude of the adjustable stimulus as the crack size of the crack increases.

In one or more embodiments to the test system, the calculation of the growth rate of the crack propagation includes to calculate a slope of a curve of the crack size as a function the plurality of cycles.

In one or more embodiments of the test system, the update of the crack size in the structure includes to calculate a new value of the crack size with an analytical technique based on a compliance calculation.

In one or more embodiments of the test system, the analytical technique is a linear elastic fracture mechanics technique or a nonlinear fracture mechanics technique.

In one or more embodiments of the test system, the crack size determined during the plurality of cycles is characterized by a lack of a manual measurement of the crack size by a test operator.

In one or more embodiments of the test system, the structure is a composite structure that forms a part of an aircraft.

A method for determining fatigue properties of a structure is provided herein. The method includes mounting the composite structure in a load frame. The composite structure has a crack with a crack size. The method includes initializing an adjustable stimulus exerted on the composite structure by the load frame based on the crack size and a strain energy release rate, and applying the adjustable stimulus to the composite structure in a current cycle of a plurality of cycles. The adjustable stimulus is an adjustable load or an adjustable displacement applied to the composite structure. The method further includes measuring a response of the composite structure in the current cycle, updating the crack size used in a next cycle of the plurality of cycles based on the response as measured in the current cycle and the adjustable stimulus used in the current cycle, and updating the adjustable stimulus used in the next cycle. The adjustable stimulus in the next cycle maintains the strain energy release rate approximately constant based on the crack size used in the next cycle. The method includes applying a plurality of different values of the adjustable stimulus over the plurality of cycles, calculating a growth rate of a crack propagation in the composite structure based on the response in each of the plurality of cycles, and storing the growth rate in a file.

The above features and advantages, and other features and advantages of the present disclosure are readily apparent from the following detailed description of the best modes for carrying out the disclosure when taken in connection with the accompanying drawings.

DETAILED DESCRIPTION

Figure 1:
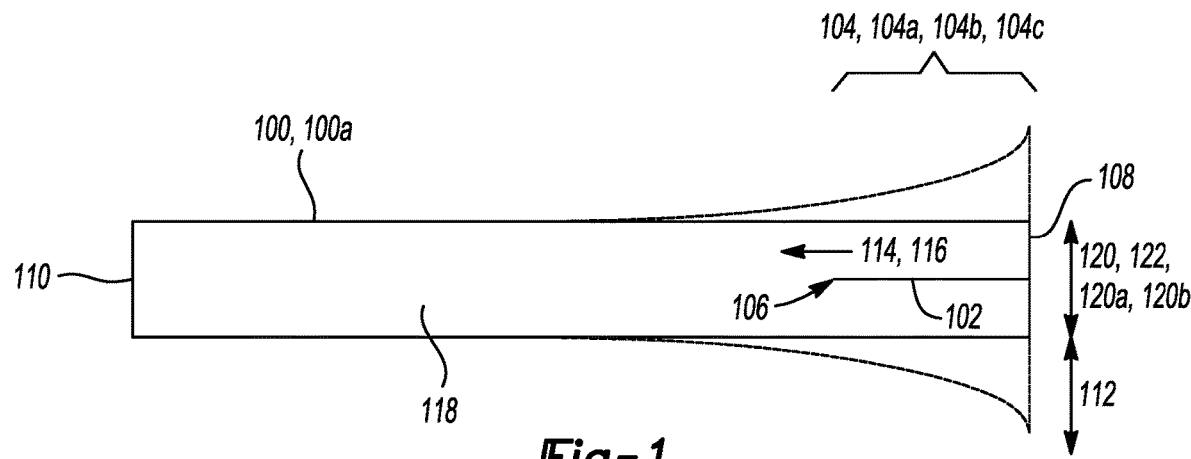
FIG. 1 is a schematic diagram of a structure under test in accordance with one or more exemplary embodiments.

Embodiments of the present disclosure include a method and/or a test system for automatically determining fatigue properties of structures (e.g., composite structures). A feedback loop is used to automatically calculate a location of a crack tip of a crack in a structure under test resulting in a constant strain energy release rate loading/displacement. An automation load/displacement shedding process maintains the constant strain energy release rate loading/displacement as the crack grows.

A structural analysis may use a virtual crack closure technique (VCCT) to simulate an interlaminar fatigue response from the composite structure coupons through large structural length scales (configured structure). The virtual crack closure technique is a numerical implementation of linear elastic fracture mechanics (LEFM) technique. The linear elastic fracture mechanics is modeled using a slow growth mathematical model where the delamination/disbond grows a finite distance "a" for each cycle N. The result is known as Paris Law crack propagation and is represented graphically as a slope da/dN. The equation governing da/dN growth is given as a function of strain energy release rate G, but is fixed for a given R-ratio (relationship between a maximum applied load/displacement and a minimum applied load/displacement). A similar approach is used for energy-based cohesive methods. Other types of fatigue/cyclic loadings may include, but are not limited to, constant amplitude, block amplitude, and random block amplitude (from less complex up to full spectrum complexity).

The slope of the Paris Law involves testing of numerous coupons to generate the properties as inputs to the virtual crack closure technique analysis. For composite structures, the properties are modal based depending on the type of loading. The analysis may utilize Mode I (opening mode) and/or Mode II (sliding mode) crack growth rates. A test used to determine the property for the Mode I is a double cantilevered beam (DCB) test. The Paris Law behavior (e.g., da/dN) is determined over a range of strain energy release rates G from an onset of crack growth (e.g., a first threshold) to rapid crack propagation (e.g., a second threshold).

The double cantilevered beam test output data (e.g., load-displacement) is represented by the linear elastic fracture mechanics mathematical model. Through the linear elastic fracture mechanics, the experimental response may be idealized to relate the force, displacement, and location of the crack. The closed form solution comes in many forms. An example closed form solution is provided by equation 1 as follows:

$$\text{Peak Load} = \frac{w}{2}\sqrt{\frac{G \cdot E \cdot t}{2\left(\alpha_1 + \frac{2\alpha\alpha_2}{h} + \frac{3\alpha^2\alpha_3}{h^2}\right)}} \qquad \text{Eq. (1)}$$

Where w is a specimen width, E is an E11 modulus, t is a speciment thickness, and h is a half speciment thickness. The parameters w, E, t, and h are known properties. The parameters $\alpha_1$, $\alpha_2$, and $\alpha_3$ are constants. By way of example, the constants may be 3.8, 3.78, and 1.0, respectively. Other values may be used based on the type of system being tested.

By running a static test, the constants may be anchored accordingly to describe a material-specific response. Since force and displacement are related by compliance, and the compliance is a function of crack length, the crack length is determinable from the load frame during testing using the closed form solution. Therefore, the load/displacement is automatically adjusted as the crack grows to maintain a constant strain energy release rate G throughout a test. The closed form solution, once calibrated, provides an accurate description of the relationship between the applied load, the displacement, the targeted strain energy release rate G value, and the location of the crack.

Referring to FIG. 1, a schematic diagram of an example structure 100 under test is shown in accordance with one or more exemplary embodiments. In various embodiments, the structure 100 (or coupon) may be a composite structure 100a formed from composite materials. In other embodiments, the structure 100 may be formed from one or more metals. The structure 100 has a general bar shape with a first end 108 and a second end 110. The crack 102 is formed in the structure 100 at the first end 108.

The crack 102 may have a crack size 104 (or crack length). A crack tip 106 is defined as an end of the crack 102 opposite the first end 108 of the structure 100. Before testing begins, the crack size 104 may be referred to as an initial crack size 104*a* (or initial crack length). As the testing proceeds, the crack size 104 grows to an updated crack size 104*b* having a new value 104*c* for the crack length.

With the second end 110 of the structure 100 secured to a load frame, an adjustable stimulus (e.g., an adjustable load or an adjustable displacement) applied at the first end 108 of the structure 100 causes a response 112 of the structure 100. The response 112 is generally a bending of the structure 100 (e.g., bending up and down as illustrated). The adjustable stimulus 120 generally has an amplitude 122. The bending causes a crack propagation 116 of the crack 102 (e.g., right to left as illustrated) at a growth rate 114 for a constant strain energy release rate 118.

Figure 2:
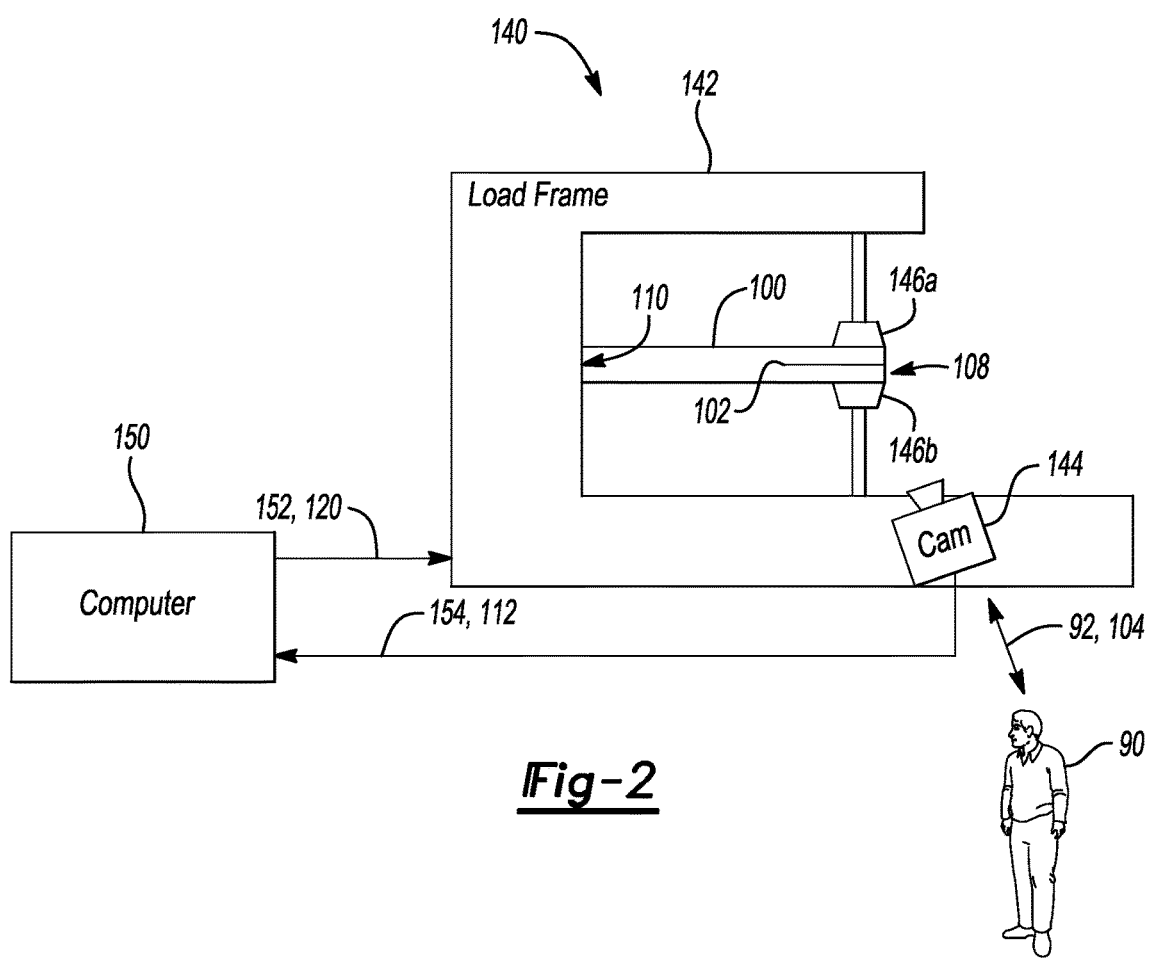
FIG. 2 is a schematic diagram of a test system in accordance with one or more exemplary embodiments.

Referring to FIG. 2, a schematic diagram of an example implementation of a test system 140 is shown in accordance with one or more exemplary embodiments. The test system 140 generally includes a load frame 142 and a computer 150. The load frame 142 includes a camera 144 and multiple (e.g., two) end blocks 146*a*-146*b*. The test system 140 is operational to automatically exercise the structure 100 to cause an approximately constant strain energy release rate 118 due to the crack 102. The test system 140 may be characterized by an absence (or lack thereof) of a test operator 90 that controls the testing through manual adjustments of the adjustable stimulus and/or conducts manual measurements 92 of the crack size 104.

A command signal 152 is generated by the computer 150 and presented to the load frame 142. The command signal 152 controls the adjustable stimulus 120 that the load frame 142 applies to the structure 100. In various embodiments, the adjustable stimulus 120 may be an adjustable load 120*a*. In other embodiments, the adjustable stimulus 120 may be an adjustable displacement 120*b*. The command signal 152 generally conveys information for the amplitude 122 of the adjustable stimulus 120. The camera 144 generates a measurement signal 154 received by the computer 150. The measurement signal 154 conveys the response 112 of the structure 100 to the adjustable stimulus 120.

The load frame 142 implements an instrumented variable load frame. The load frame 142 is operational to apply repeatedly the adjustable stimulus 120 to the structure 100 over multiple cycles, and measure the response 112 of the structure 100 subjected to the adjustable stimulus 120 in each cycle. The adjustable stimulus 120 is controlled by the computer 150 through the command signal 152. The measured response 112 of the structure 100 to the adjustable stimulus 120 is presented in the measurement signal 154 from the load frame 142 to the computer 150.

The camera 144 implements an optical camera. The camera 144 is operational to measure the response 112 of the structure 100 to the adjustable stimulus 120. The measured response 112 is transmitted to the computer 150 in the measurement signal 154.

The end blocks 146*a*-146*b* implement temporary connections between the load frame 142 and the structure 100. The end blocks 146*a*-146*b* are secured to the structure 100 approximately at the first end 108 of the structure 100 on either side of the crack 102. The end blocks 146*a*-146*b* transfer the adjustable stimulus 120 from the load frame 142 to the structure 100 to expand the crack 102.

The computer 150 implements one or more data processing computers. The computer 150 is connected to the load frame 142 and the camera 144. In embodiments with multiple computers 150, the individual computers 150 are coupled together to share data, memory space, and processing resources. The computer 150 may be operational to store configuration parameters used for testing the structure 100, execute software used to control the load frame 142, and execute software that analyzes the information received from the camera 144. The measurements received from the camera 144 are processed to determine the growth rate 114 of the crack 102. Data for the growth rate 114 is stored in a file. The growth rate 114 is generally suitable for analysis by one or more analytical techniques.

In various embodiments, the computer 150 may be configured by the software to perform one or more of a variety of tests on the structure 100. The tests may include, but are not limited to, a double cantilevered beam test and a fracture toughness testing in Mode I, Mode II (e.g., end notch flexure/edge notch flexure test), and various combinations of mixed Mode I/Mode II tests. Other tests may be implemented to meet the design criteria of a particular application. In some embodiments, the computer 150 may be configured by the software to perform one or more of a variety of analysis techniques on the measurement data to determine fatigue properties of the structure 100. The analysis may include, but are not limited to, analytical techniques, compliance calculations, the virtual crack closure technique, material behavior analyses (e.g., closed form solution for crack growth), Paris Law behavior, linear elastic fracture mechanics technique, and nonlinear fracture mechanics technique. Other analysis techniques may be implemented to meet the design criteria of a particular application.

Figure 3:
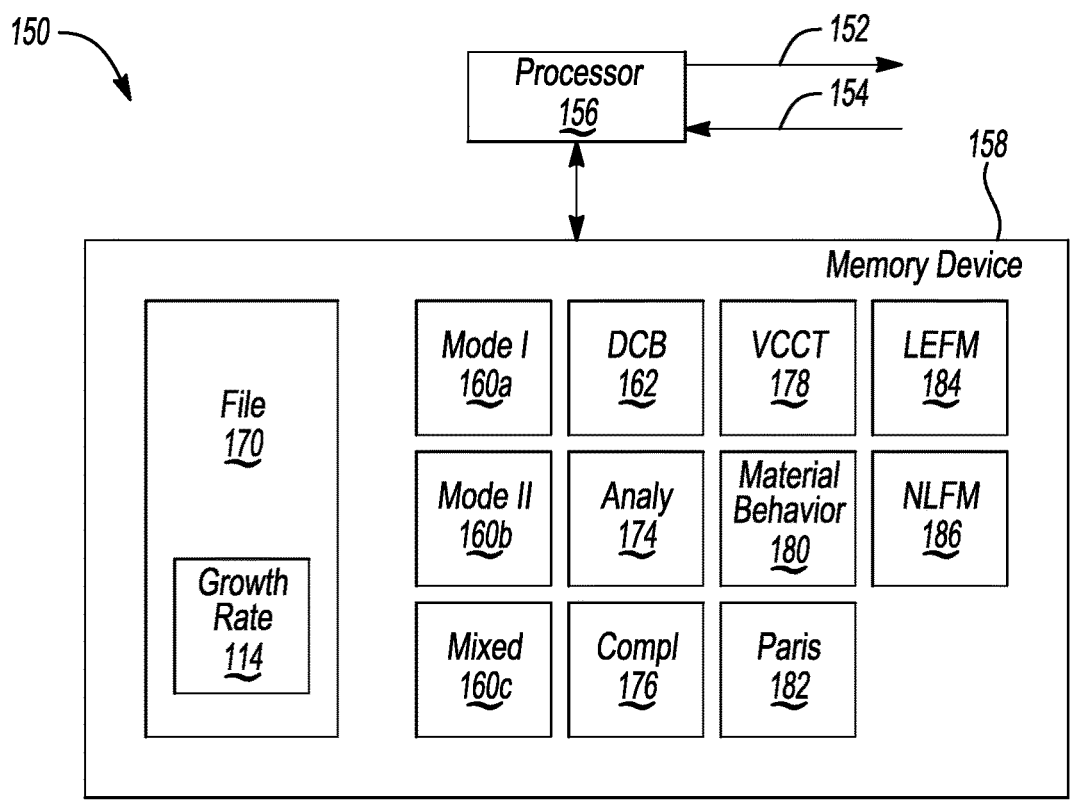
FIG. 3 is a schematic diagram of a computer in the test system in accordance with one or more exemplary embodiments.

Referring to FIG. 3, a schematic diagram of an example implementation of the computer 150 is shown in accordance with one or more exemplary embodiments. The computer 150 may include one or more processors 156 (one shown) and one or more memory devices 158 (one shown). The processor 156 may generate the command signal 152 and receive the measurement signal 154.

The processor 156 implements one or more processors within the computer 150. The processor 156 is in communication with the memory device 158 to exchange commands and data. The processor 156 is operational to execute the software tools used to control the load frame 142 via the command signal 152 and analyze the data measured received from the camera 144 in the measurement signal 154.

The memory device 158 is in communication with the processor 156. The memory device 158 may implement a non-transitory storage medium and a transitory storage medium (e.g., random access memory, read-only memory, magnetic hard drives, solid-state drives, etc.). The non-transitory storage medium may hold one or more instructions (or software programs) executed by the processor 156 to perform the tests and analyze the measured data. The transitory storage medium may hold at least the file 170 that stores the calculated growth rate data 114 of the crack 102 (FIG. 1). The software programs may include the Mode I test 160*a*, the Mode II test 160*b*, the mixture 160*c* of the Mode I test and the Mode II test, the double cantilevered beam test 162, the analytical technique 174, the compliance calculations 176, the virtual crack closure technique (VCCT) 178, and material behavior 180 based on a closed form solution for crack growth such as the Paris Law behavior 182, the linear elastic fracture mechanics (LEFM) technique 184, and the nonlinear fracture mechanics (NLFM) technique 186. Other software programs may be implemented to meet the design criteria of a particular application. For example, other data analysis techniques may be energy-based techniques such as cohesive models, and crack band/traction-separation implementations of energy-based techniques.

The double cantilever beam test is a test method for measuring Mode I fracture toughness of unidirectional composites. For Mode II toughness, a composite structure similar to is used and is loaded in a three-point bending configuration.

The compliance reflects an ability to change a shape of the structure 100 when the adjustable stimulus 120 is applied. The compliance of a system is defined as the change in volume that occurs per unit change in the pressure of the system. In other words, the compliance is the ease with which an elastic structure stretches. In particular, the compliance is a measurement of the elastic resistance of the structure 100. The closed form solutions are based on the compliance calculations, and the unknown parameter being solved is the crack size 104.

Figure 4:
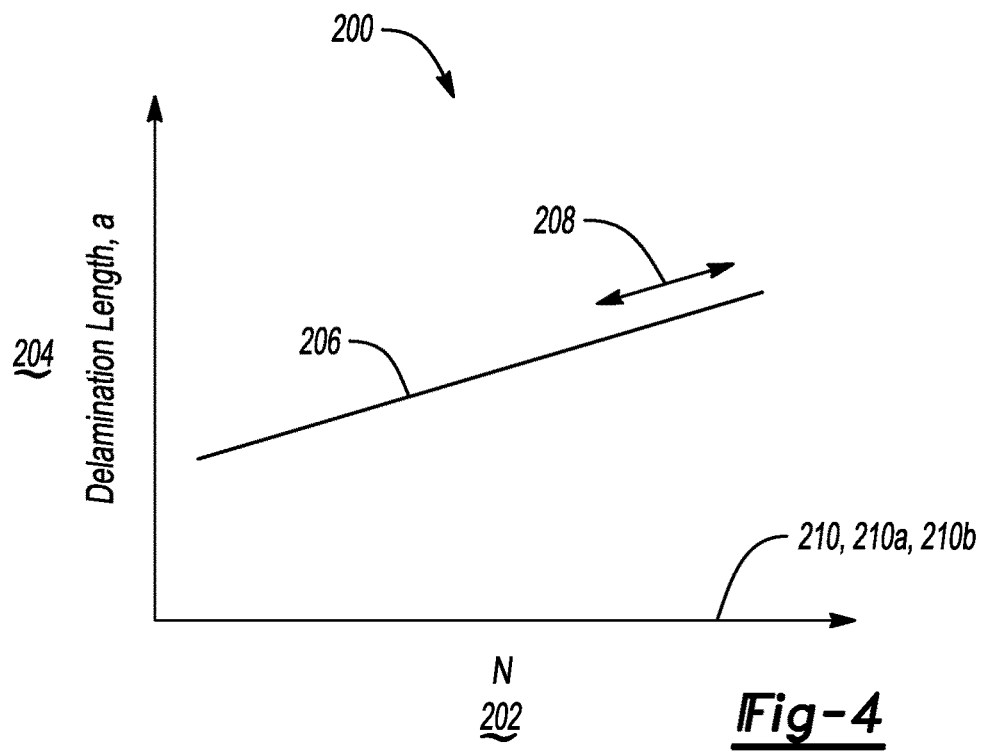
FIG. 4 is a graph of a delamination length as a function of cycles in accordance with one or more exemplary embodiments.

Referring to FIG. 4, a graph 200 of an example delamination length as a function of cycles is shown in accordance with one or more exemplary embodiments. The graph 200 includes an X-axis 202 and a Y-axis 204. The X-axis 202 indicates a number of cycles 210 (N) that the structure 100 is subjected to by the adjustable stimulus 120. The Y-axis 204 indicates a delamination length (a) (e.g., the crack length).

A curve 206 represents the delamination length as a function of the number of cycles 210 for a constant strain energy release rate 118. Ideally, a slope 208 of the curve 206 may be a constant. The slope 208 establishes a single point for da/dN, or Paris Law behavior, of the structure 100 at a particular strain energy release rate 118. Multiple da/dN points for multiple strain energy release rates 118 characterize an interlaminar fatigue property of a composite structure 100a. Due to the clean nature of the automated measurements, the da/dN behavior may be determined in less than the hundreds to thousands of cycles used in some existing techniques.

Figure 5:
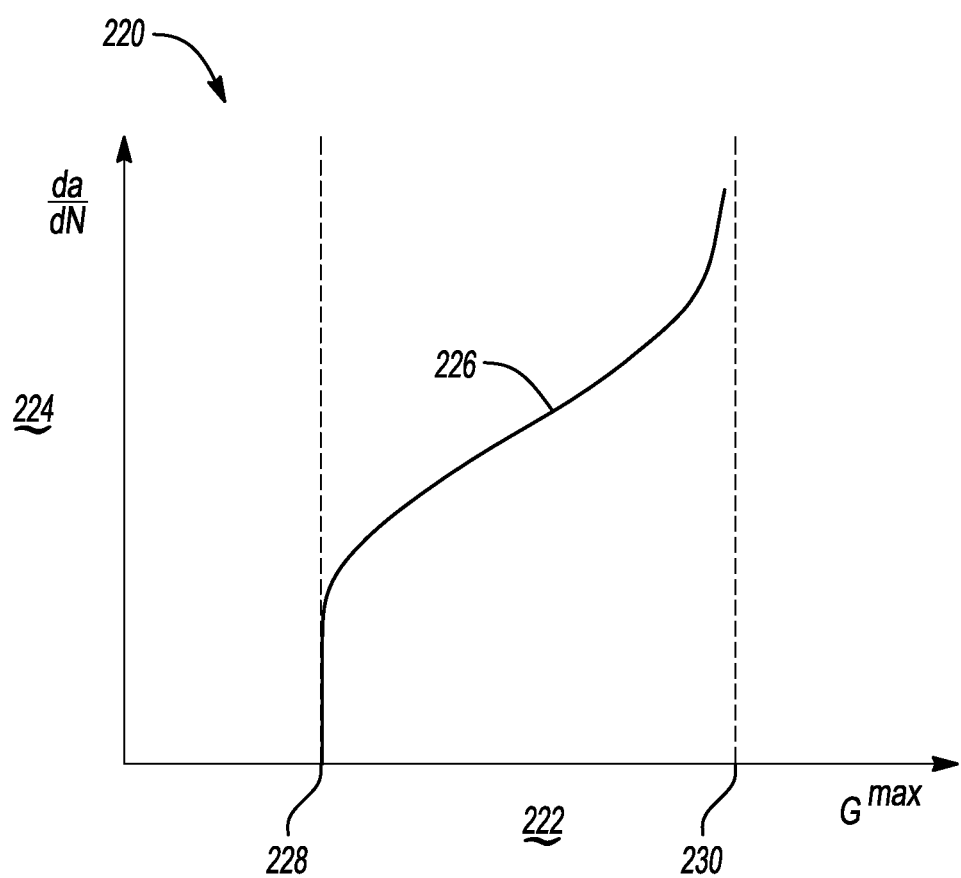
FIG. 5 is a graph of Paris law behavior in accordance with one or more exemplary embodiments.

Referring to FIG. 5, a graph 220 of an example implementation of Paris law behavior is shown in accordance with one or more exemplary embodiments. The graph 220 includes an X-axis 222 and a Y-axis 224. The X-axis 222 indicates a rate of crack propagation ($G^{max}$) in units of kilojoules/meters$^2$. The Y-axis 224 indicates the da/dN behavior of the structure 100 in units of millimeters/cycle.

A curve 226 illustrates an example set of da/dN points (see FIG. 4) measured from a structure 100 at multiple strain energy release rates 118. The da/dN behavior is approximately inversely related to the number of cycles 210 (e.g., da/dN~1/N). Below a first threshold 228, the crack 102 (FIG. 1) generally does not grow. Above a second threshold 230, the crack 102 propagates at an exponentially increasing rate. Between the first threshold 228 and the second threshold 230, the crack 102 generally propagates at a constant rate. The constant rate may be expressed by equation 2 as follows:

$$da/dN = C(G^{max})^m \qquad \text{Eq. (2)}$$

Where C and m are characteristics of the structure material.

Figure 6:
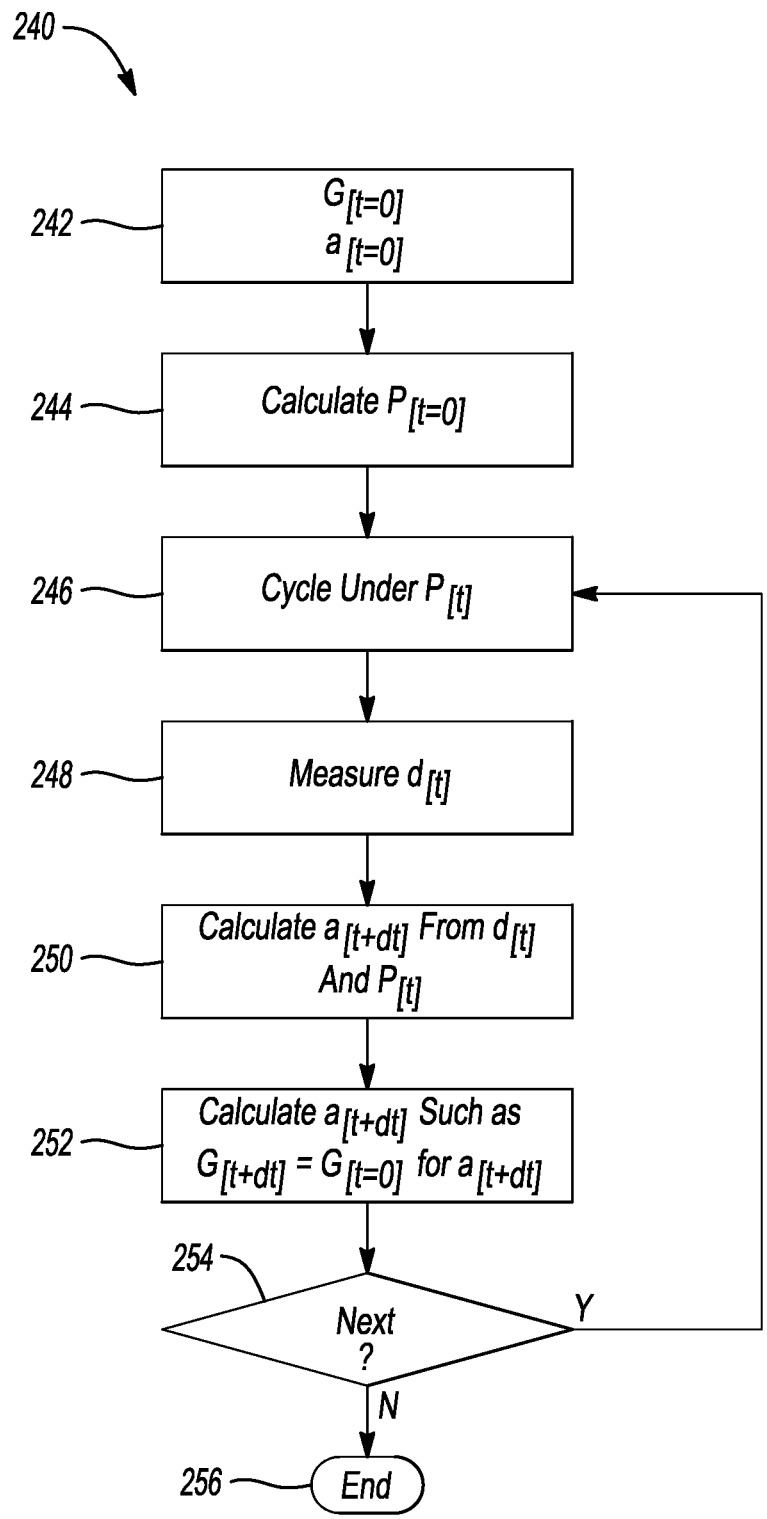
FIG. 6 is a flow diagram of a test method for determining fatigue properties of the structure in accordance with one or more exemplary embodiments.

Referring to FIG. 6, a flow diagram of an example test method 240 for determining fatigue properties of a structure is shown in accordance with one or more exemplary embodiments. The test method (or process) 240 may be performed by the test system 140 on a structure 100. The test method 240 generally includes steps 242 to 256, as illustrated. The sequence of steps is shown as a representative example. Other step orders may be implemented to meet the criteria of a particular application.

Referring to FIG. 6 and FIG. 1, the method 240 starts by using the closed form solution to set a target stimulation. The stimulation is used in the step 242 to calculate the constant value $G_{[t=0]}$ for the strain energy release rate 118 and an initial crack size 104a ($a_{[t=0]}$) at an initial time for the cycling target of interest. In the step 244, the adjustable stimulus 120 ($P_{[t=0]}$) is calculated at the initial time. For each cycle 210 (dt), the adjustable stimulus 120 (P) is prescribed in the step 246. The response 112 (e.g., displacement $D_{[t]}$) is measured in the step 248 from the load frame 142 in a current cycle 210a. In the step 250, the closed form solution is used to calculate an updated crack size 104b ($a_{[t+dt]}$) from the displacement $D_{[t]}$ and the stimulus $P_{[t]}$. In the step 252, the updated stimulus $P_{[t+dt]}$ in a next cycle 210b is solved for in the closed form solution to ensure that the G value is constant (e.g., $G_{[t+dt]}=G_{[t=0]}$ at the crack length $a_{[t+dt]}$) during the testing. Therefore, the testing may be automated instead of manual. In the step 254, a check is performed to determine if the next cycle 210b may be run. If more cycles 210 are appropriate, the method 240 returns to the step 246 for another cycle 210. If not, the testing ends in the step 256.

As the crack 102 grows, the adjustable stimulus 120 is reduced (e.g., lowered) in accordance with the targeted strain energy release rate value G. In various embodiments, the test data is subsequently used to determine the crack size 104 versus the cycle response, from which the slope of the curve is da/dN at the constant value G. Individual data points are extracted from each targeted strain energy release rate 118 and plotted to form the da/dN curve (e.g., curve 226 in FIG. 5). The slope of the curve 226 is the property entered into the virtual crack closure technique 178 as input data for the Paris Law behavior 182. The computer control replaces the test operator 90 (FIG. 2) to measure the crack size 104. The approach also reduces scatter in the data points and so provides an improved fit for the Paris Law parameters using orders of magnitude fewer structures 100/test data points.

Figure 7:
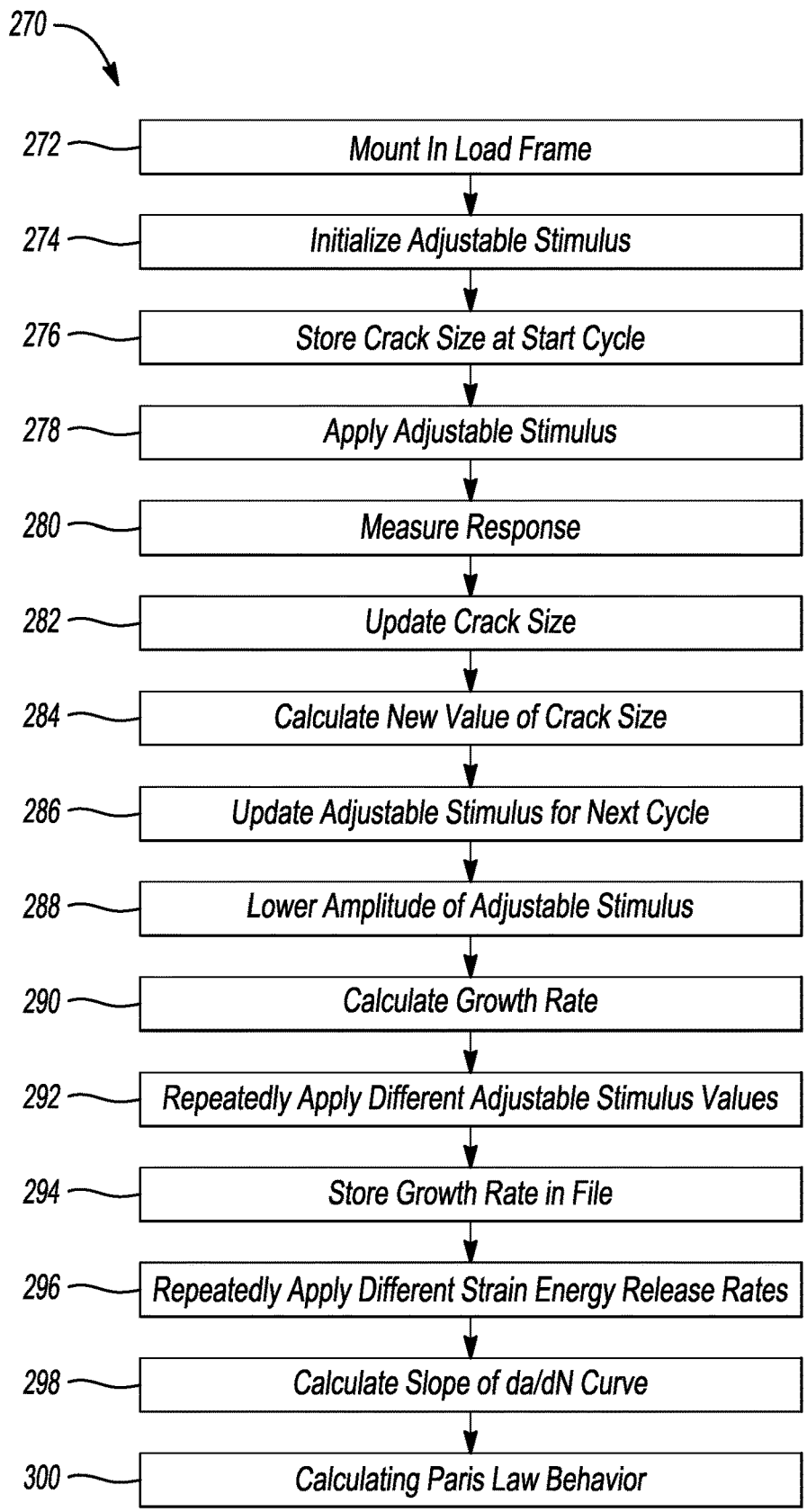
FIG. 7 is a flow diagram of a detailed method for determining the fatigue properties of the structure in accordance with one or more exemplary embodiments.

Referring to FIG. 7, a flow diagram of an example detailed method 270 for determining fatigue properties of a structure is shown in accordance with one or more exemplary embodiments. The method (or process) 270 may be performed by the test system 140 on a structure 100. The test method 240 generally includes steps 272 to 300, as illustrated. The sequence of steps is shown as a representative example. Other step orders may be implemented to meet the criteria of a particular application.

Referring to FIG. 1, FIG. 3, and FIG. 7, in the step 272 the structure 100 is mounted in the load frame 142. The computer 150 initializes the adjustable stimulus 120 exerted on the structure 100 by the load frame 142 based on the crack size 104 and the strain energy release rate 118 in the step 274 (same as step 242 in the method 240). The initial crack size 104a is stored in the memory device 158 in the step 276 at the start of the cycles 210.

In the step 278, the adjustable stimulus 120 is applied to the structure 100 in an initial cycle 210 and is repeatedly applied over multiple cycles 210. During each cycle 210, the response 112 of the structure 100 is measured by the camera 144 in the step 280 and the measurement data presented to the computer 150.

In the step 282, the computer 150 updates the crack size 104b used in a next cycle 210b based on the measured response 112 in the current cycle 210a and the adjustable stimulus 120 used in the current cycle 210a. The updating of the crack size 104b generally includes calculating a new value 104c of the crack size 104b with the analytical technique 174 based on the compliance calculation 176 in the step 284.

In the step 286, the computer 150 updates the adjustable stimulus 120 to be used in the next cycle 210b. The adjustable stimulus 120, as updated, maintains the strain energy release rate 118 approximately constant based on updated the crack size 104b expected in the next cycle 210b. The updating of the adjustable stimulus 120 may be a lowering of the amplitude 122 of the adjustable stimulus 120 in the step 288 as the crack size 104 of the crack 102 increases. In various embodiments, the adjustable stimulus 120 may be manually adjusted from time to time as the crack size 104 increases. The computer 150 calculates the growth rate 114 of the crack propagation 116 in the structure 100 based on the response 112 in each cycle 210. In the step 292, the different values of the adjustable stimulus 120 are applied in the subsequent cycles 210 to maintain the strain energy release rate 118 approximately constant.

In the step 294, the computer 150 stores the growth rate 114 in the file 170. The application of the adjustable stimulus 120 to the structure 100, the measurement of the response 112, the update of the crack size 104b, the update of the adjustable stimulus 120, and the calculation of the growth rate 114 are repeated at multiple different strain energy release rates in the step 296.

For a Paris Law analysis, the slope of the da/dN curve is calculated in the step 298 as a function of the cycles 210. In the step 300, the Paris Law behavior of the crack 102 within the structure 100 is determined based on the growth rate 114 at the various different strain energy release rates 118. Other analysis techniques and subsequent behavior determinations may be implemented to meet the design criteria of a particular application.

Figure 8:
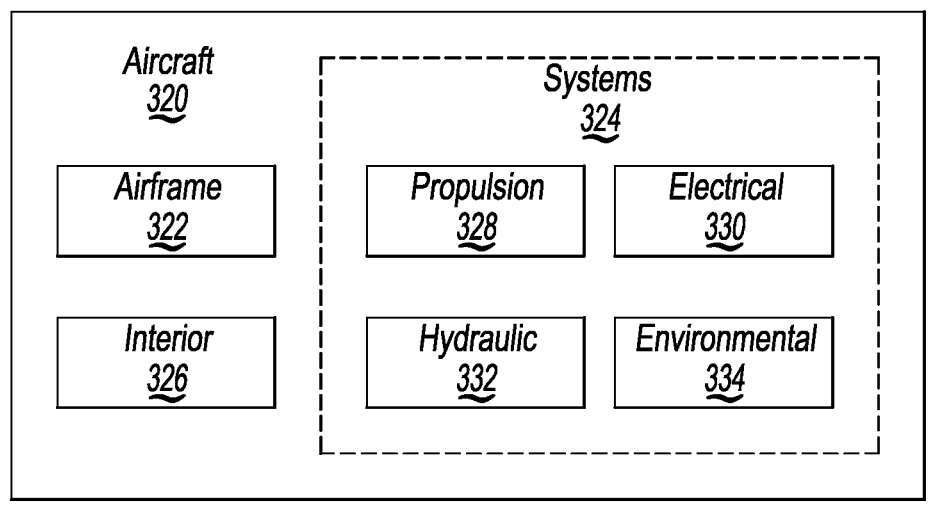
FIG. 8 is a schematic diagram of components of an aircraft in accordance with one or more exemplary embodiments.

Referring to FIG. 8, a schematic diagram of example components of an aircraft 320 is shown in accordance with one or more exemplary embodiments. The aircraft 320 may include one or more structures 100 and/or one or more composite structure 100a. The aircraft 320 includes an airframe 322 with a plurality of systems 324 and an interior 326. Examples of the systems 324 include one or more of a propulsion system 328, an electrical system 330, a hydraulic system 332, and an environmental system 334. Various numbers of other systems may be included. Although an aerospace example is shown, the principles of the disclosure may be applied to other industries, such as the automotive industry.

The test system 140 and associated methods includes a feedback loop that automatically calculates the location of the crack tip resulting in a constant strain energy release rate loading. The solution provides a constant G stimulus (e.g., loading or displacements). The solution ensures that as the crack advances, there is no change in the strain energy release rate. the constant strain energy release rate results in improved measurements of the da/dN behavior for a given approach. A test operator is not relied upon to measure the crack growth for each cycle. Due to the clean nature of the measurements, the testing may be reduced below millions of cycles to generate the da/dN response. The reduced number of cycles saves time, budget, and enables quicker decision making for analysis work. A single specimen may be used to generate multiple data points on the da/dN curves so fewer numbers of specimens are consumed to develop the constant G curves. Furthermore, the solution reduces the scatter associated with the da/dN curves enabling engineers to have confidence in the properties being measured. The solution may be applicable to other test methods for interlaminar testing, namely Mode II response, and mixed-Mode I/Mode II responses. In various embodiments, the test system 140 and associated methods may be used to determine both interlaminar (e.g., ply) and intralaminar (e.g., laminate) constant G values using similar approaches. The underlying theory may be modified for the different cases, but the fracture mechanics and test approach may be similar.

This disclosure is susceptible of embodiments in many different forms. Representative embodiments of the disclosure are shown in the drawings and are herein described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference, or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for determining interlaminar fatigue properties of a composite structure, the method comprising:
   mounting the composite structure in a load frame, wherein the composite structure has a crack with a crack size;
   applying repeatedly an adjustable load to the composite structure over a plurality of cycles in the load frame;
   storing the crack size at a start of the plurality of cycles;

measuring a displacement of the composite structure in each of the plurality of cycles;

updating the crack size in response to the displacement in each of the plurality of cycles;

updating the adjustable load in each of the plurality of cycles, wherein the adjustable load as updated maintains a strain energy release rate approximately constant based on the crack size, wherein the updating of the adjustable load comprises lowering the adjustable load as the crack size increases;

calculating a growth rate of a crack propagation in the composite structure based on the displacement in each of the plurality of cycles; and storing the growth rate in a file, wherein the file is suitable for analysis in a virtual crack closure technique.

2. The method according to claim 1, further comprising:
repeating the applying of the adjustable load, the measuring of the displacement, the updating of the crack size, the updating of the adjustable load, and the calculating of the growth rate at a plurality of different strain energy release rates.

3. The method according to claim 2, further comprising:
calculating a Paris Law behavior of the composite structure based on the growth rate at the plurality of different strain energy release rates.

4. The method according to claim 1, wherein the load frame is operational to perform a double cantilevered beam test.

5. The method according to claim 1, wherein the calculating of the growth rate of the crack propagation comprises:
calculating a slope of a curve of the crack size as a function the plurality of cycles.

6. The method according to claim 1, wherein the updating of the crack size in the composite structure comprises:
calculating a new value of the crack size with an analytical technique based on the displacement.

7. The method according to claim 6, wherein the analytical technique is a linear elastic fracture mechanism technique.

8. The method according to claim 6, wherein a determination of the crack size during the plurality of cycles is characterized by a lack of a manual measurement of the crack size by a test operator.

9. The method according to claim 1, further comprising analyzing the file using the virtual crack closure technique to simulate an interlaminar fatigue response from a coupon of the composite structure through large structural length scales, wherein the virtual crack closure technique comprises a numerical implementation of linear elastic fracture mechanics, and wherein the linear elastic fracture mechanics are modeled using a slow growth mathematical model where a delamination grows a finite distance for each of the plurality of cycles.

10. A test system comprising:
a load frame operational to:
apply repeatedly an adjustable load to a composite structure over a plurality of cycles, wherein the composite structure has a crack with a crack size; and measure a displacement of the composite structure in each of the plurality of cycles; and a computer coupled to the load frame and operational to:
store the crack size at a start of the plurality of cycles;
update the crack size in response to the displacement in each of the plurality of cycles;
update the adjustable load in each of the plurality of cycles, wherein the adjustable load as updated maintains a strain energy release rate approximately constant based on the crack size, wherein the update of the adjustable load comprises lower the adjustable load as the crack size increases;

calculate a growth rate of a crack propagation in the composite structure based on the displacement in each of the plurality of cycles; and store the growth rate in a file, wherein the file is suitable for analysis in a virtual crack closure technique.

11. The test system according to claim 10, wherein the load frame and the computer are further operational to:
repeat the applying of the adjustable load, the measuring of the displacement, the updating of the crack size, the updating of the adjustable load, and the calculating of the growth rate at a plurality of different strain energy release rates.

12. The test system according to claim 11, wherein the computer is further operational to:
calculating a Paris Law behavior of the composite structure based on the growth rate at the plurality of different strain energy release rates.

13. The test system according to claim 10, wherein the load frame is operational to perform a double cantilevered beam test.

14. The test system according to claim 10, wherein the calculation of the growth rate of the crack propagation comprises:
calculate a slope of a curve of the crack size as a function the plurality of cycles.

15. The test system according to claim 10, wherein the update of the crack size in the composite structure comprises:
calculate a new value of the crack size with an analytical technique based on the displacement.

16. The test system according to claim 15, wherein the analytical technique is a linear elastic fracture mechanism technique.

17. The test system according to claim 15, wherein a determination of the crack size during the plurality of cycles is characterized by a lack of a manual measurement of the crack size by a test operator.

18. The test system according to claim 10, wherein the composite structure forms a part of an aircraft.

19. A method for determining interlaminar fatigue properties in a composite structure, the method comprising:
mounting the composite structure in a load frame, wherein the composite structure has a crack with a crack size;

initializing an adjustable load exerted on the composite structure by the load frame based on the crack size and a strain energy release rate;

applying the adjustable load to the composite structure in a current cycle of a plurality of cycles;

measuring a displacement of the composite structure in the current cycle;

updating the crack size used in a next cycle of the plurality of cycles in response to the displacement as measured in the current cycle and the adjustable load used in the current cycle;

updating the adjustable load used in the next cycle, wherein the adjustable load in the next cycle maintains the strain energy release rate approximately constant based on the crack size used in the next cycle, wherein the updating of the adjustable load comprises lowering the adjustable load as the crack size increases;

applying a plurality of different values of the adjustable load over the plurality of cycles;

calculating a growth rate of a crack propagation in the composite structure based on the displacement in each of the plurality of cycles; and storing the growth rate in a file, wherein the file is suitable for analysis in a virtual crack closure technique.

20. The method according to claim 19, further comprising analyzing the file using the virtual crack closure technique to simulate an interlaminar fatigue response from a coupon of the composite structure through large structural length scales, wherein the virtual crack closure technique comprises a numerical implementation of linear elastic fracture mechanics, and wherein the linear elastic fracture mechanics are modeled using a slow growth mathematical model where a delamination grows a finite distance for each of the plurality of cycles.

* * * * *